(12) United States Patent
Skingsley et al.

(10) Patent No.: US 6,697,751 B2
(45) Date of Patent: Feb. 24, 2004

(54) APPARATUS FOR ASSESSING COMMUNICATION EQUIPMENT

(75) Inventors: David Skingsley, Ipswich (GB); Mark A Barrett, Needham Market (GB)

(73) Assignee: British Telecommunications, London (GB)

( * ) Notice: Subject to any disclaimer, the term of this patent is extended or adjusted under 35 U.S.C. 154(b) by 0 days.

(21) Appl. No.: 10/129,195

(22) PCT Filed: Nov. 29, 2000

(86) PCT No.: PCT/GB00/04548

§ 371 (c)(1),
(2), (4) Date: May 2, 2002

(87) PCT Pub. No.: WO01/41366

PCT Pub. Date: Jun. 7, 2001

(65) Prior Publication Data

US 2003/0004684 A1 Jan. 2, 2003

(30) Foreign Application Priority Data

Dec. 1, 1999 (EP) .............................................. 99309632

(51) Int. Cl.7 .......................... G01D 3/00; G01M 19/00
(52) U.S. Cl. ...................................................... 702/108
(58) Field of Search ................................ 702/188, 122, 702/182, 116, 108; 370/395.32, 912

(56) References Cited

U.S. PATENT DOCUMENTS 5,687,388 A * 11/1997 Wooten et al. ................. 710/3
6,108,713 A * 8/2000 Sambamurthy et al. ...... 709/250
6,167,537 A * 12/2000 Silva et al. ..................... 714/46
6,195,703 B1 * 2/2001 Blumenau et al. ........... 709/238

FOREIGN PATENT DOCUMENTS

WO    WO 92/19054    10/1992

\* cited by examiner

Primary Examiner—John Barlow
Assistant Examiner—Demetrius Pretlow
(74) Attorney, Agent, or Firm—Nixon & Vanderhye, P.C.

(57) ABSTRACT

The transmission of data packets by communications equipment is tested and/or monitored. One or more transmission protocols is registered to enable communication according to any registered protocol. A request specifying at least one testing and/or monitoring operation is submitted. A received request is decoded into one or more processable events in accordance with one or more predetermined rules. The writing of data packets to, and the reading of data packets from, communications equipment is controlled. Decoding of received requests and execution of one or more processable events in accordance with the read/write control is scheduled. The above is arranged such that, when a request is received, the following is scheduled:

a) decoding the request into one or more processable events;

b) initialization of the processable events; and c) reading and writing data packets from and to communications equipment in accordance with the processable events.

5 Claims, 7 Drawing Sheets

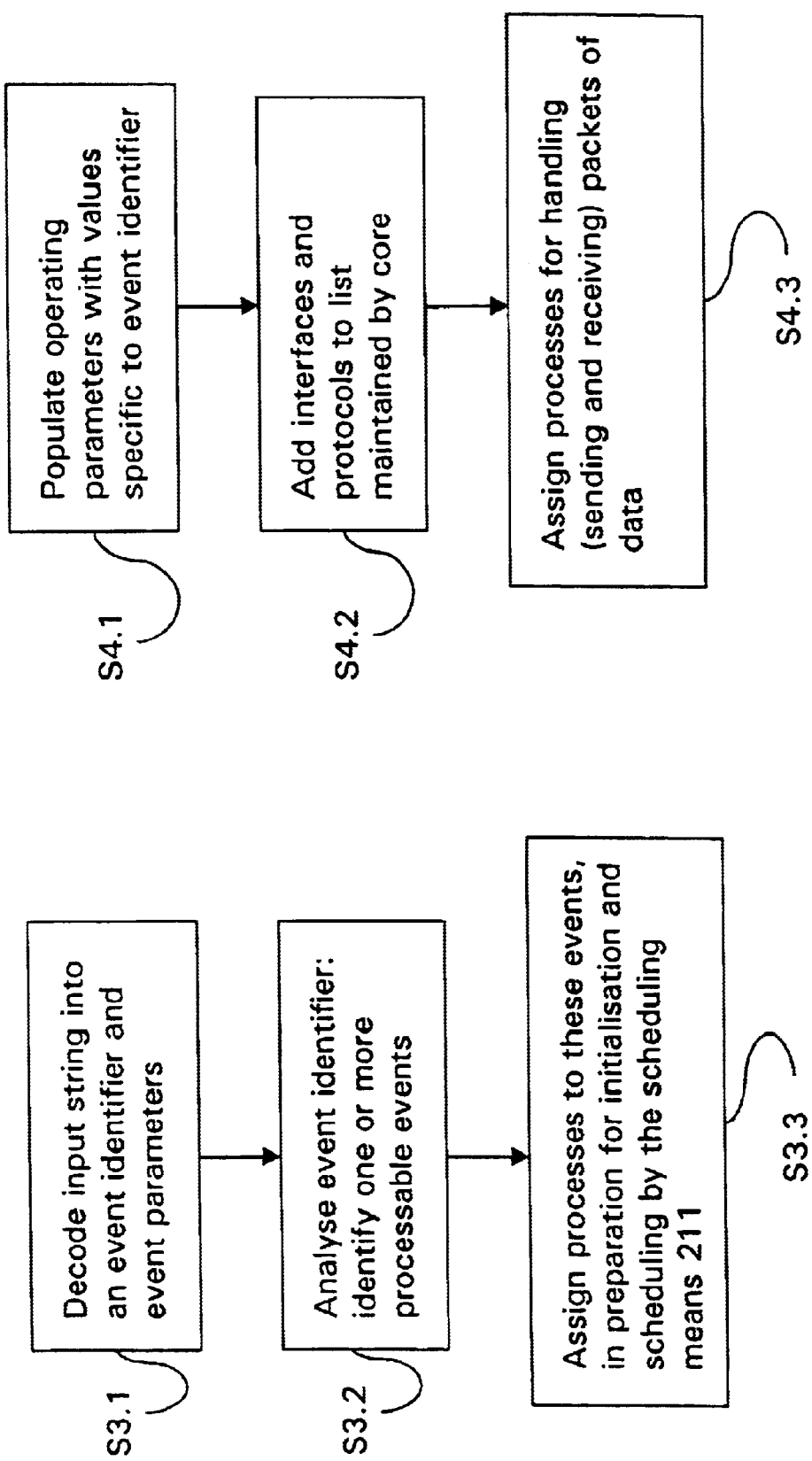

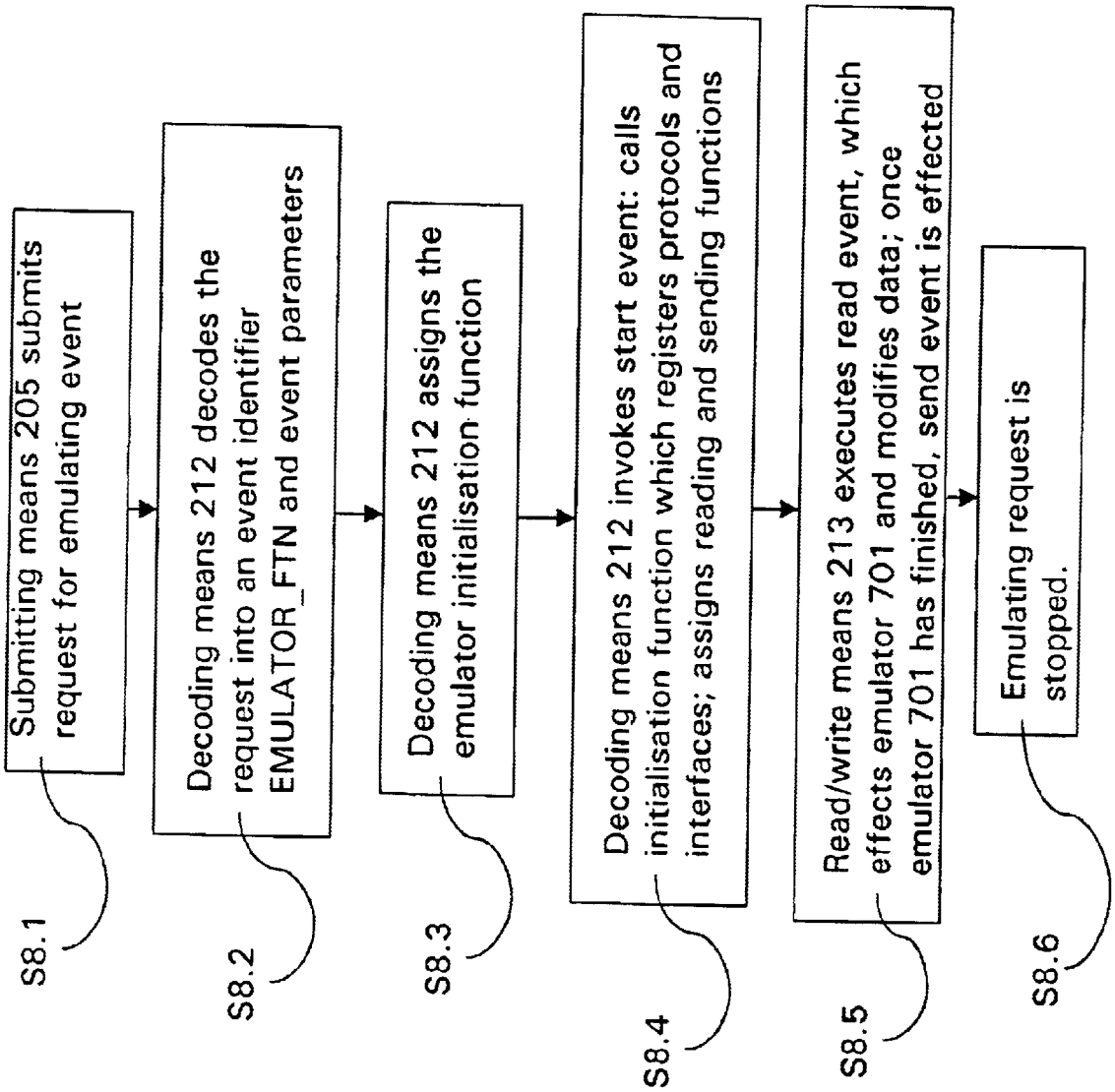

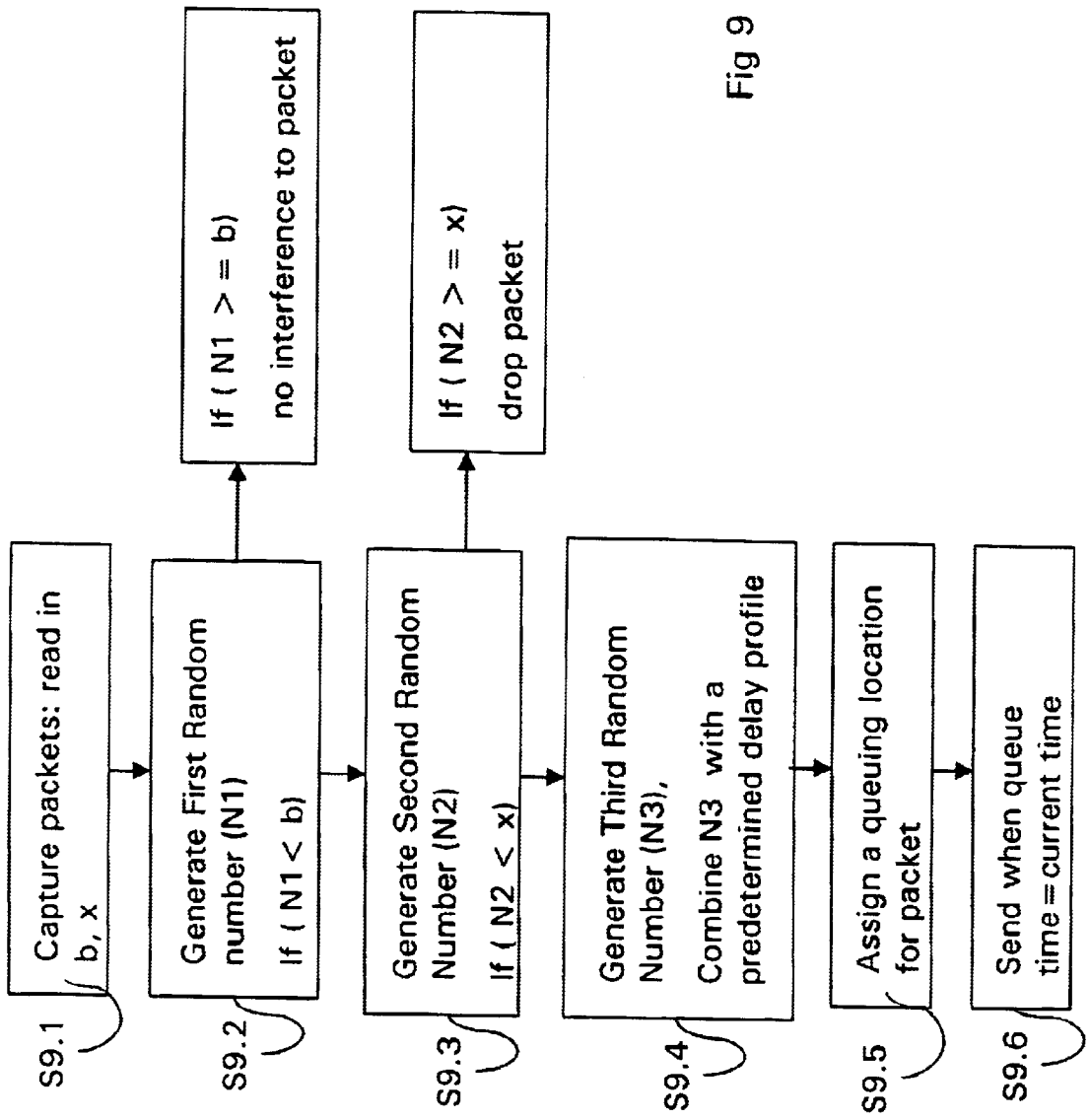

APPARATUS FOR ASSESSING COMMUNICATION EQUIPMENT

This application is the US national phase of international application PCT/GB00/04548 filed Nov. 29, 2000 which designated the U.S.

This invention relates to assessing communication equipment and is suitable particularly, but not exclusively, for testing and/or monitoring network equipment.

The continuing development of networking technology is fundamental to data communication, as this is intrinsic to, among other things, the interconnection of many disparate physical networks, and the transfer of information across multiple information sources. Significant efforts have been, and are continually, directed towards reducing limitations and increasing the flexibility of network equipment, both in the hardware and software areas. However, only a relatively small number of tools that are suitable for testing and evaluating various aspects of both new and existing network equipment have been developed.

Applications that transfer information over networks rely on network equipment to transport data between source and destination address(es), and are wholly dependent on the robustness of the network equipment for successful data transfer. Often, users of such applications experience "slow network traffic", or network failure. An inability to find faults, and to correct for those faults in a reasonable amount of time, can result in significant inconvenience to users and loss of data, and is costly. Thus, if the network equipment could be more effectively monitored, problem areas could be identified, and current levels of inconvenience could be reduced.

New transmission protocols and router technologies affect the way in which data is transferred between applications, and these applications may require to modify aspects of data formatting in order to effect successful sending and receiving of data. At present the tools that are flexible enough to analyse and test new protocols and technologies are either exceedingly expensive or limited in scope. These include tools such as:

"SmartBits™" by NetComm™, which allows a tester to edit all of the fields in the data packets, and to generate and receive traffic from a variety of media types;

"NetXray™" by Cinco™, which is configurable to probe packets travelling on a network using predetermined tests, and report any problems based on predetermined criteria.

According to a first aspect of the present invention, there is provided apparatus for testing and/or monitoring the transmission of data packets by communications equipment, the apparatus comprising:

(i) registering means for registering one or more transmission protocols to enable the apparatus to communicate according to any registered protocol;
(ii) submitting means for submitting a request, the request specifying at least one testing and/or monitoring operation;
(iii) decoding means for decoding a received request into one or more processable events in accordance with one or more predetermined rules;
(iv) read/write means for controlling the writing of data packets to, and the reading of data packets from, the communications equipment; and
(v) scheduling means for scheduling decoding of received requests and execution of the one or more processable events in accordance with the read/write means, such that, when a request is received from the submitting means, the scheduling means schedules:

a) decoding of the request into one or more processable events by the decoding means;
b) initialisation of the processable events by the decoding means; and
c) reading and writing of data packets from and to the communications equipment by the read/write means in accordance with the processable events.

Further aspects, features and advantages of the apparatus for assessing communication equipment will now be described, by way of example only as an embodiment of the present invention, and with reference to the accompanying drawings, in which:

FIG. 3 is a block diagram showing the decoding steps performed by the assessing apparatus;

FIG. 4 is a block diagram showing the initialisation processes performed by the assessing apparatus;

FIG. 8 is a block diagram showing the processes involved when the apparatus for emulating network characteristics is in operative association with the apparatus for assessing communication equipment; and FIG. 9 is a block diagram showing the steps of dropping, delaying and queuing packets performed by the emulating apparatus.

In the following description, the terms "network", "packet", "traffic", "request", "event", and "command switch" are used. These are defined as follows:

"Network": a series of points or nodes interconnected by communication paths. Networks can interconnect with other networks and contain sub-networks. A given network can be characterised by the type of data transmission technology in use on it (for example, a TCP/IP, SNA, ATM network);

"Packet": a packet is a unit of data that is routed between an origin and a destination on one or more packet-switched networks (e.g. the Internet, ATM network). When any file (e-mail message, HTML file, GIF file, URL request, and so forth) is sent from one place to another on the Internet, the Transmission Control Protocol (TCP) layer of TCP/IP divides the file into "chunks" of an efficient size for routing. Each of these packets is separately numbered and includes the Internet address of the destination. The individual packets for a given file may travel different routes through the Internet. When they have all arrived, they are reassembled into the original file (by the TCP layer at the receiving end).

When the network is an ATM network, the units of data are called cells, and when an IP network is uses the UDP protocol (User Datagram Protocol) the units of data are called datagrams.

"Traffic": movement of packets (or cells or datagrams) over a network.

"Request": input command specifying type of test or monitoring to be carried out.

"Command switch": command line input which may be decoded into system actions e.g. "xcopy -s -v": xcopy is system function, and -s -v are flags corresponding to event parameters associated with the function; or "-p -O 2048": -p is the function to be performed and -O 2048 is a corresponding event parameter. (A request comprises both the function to be performed and the event parameters).

"event": a process performed by the assessment apparatus, for instance in fulfilling a request.

Overview

Figure 1:
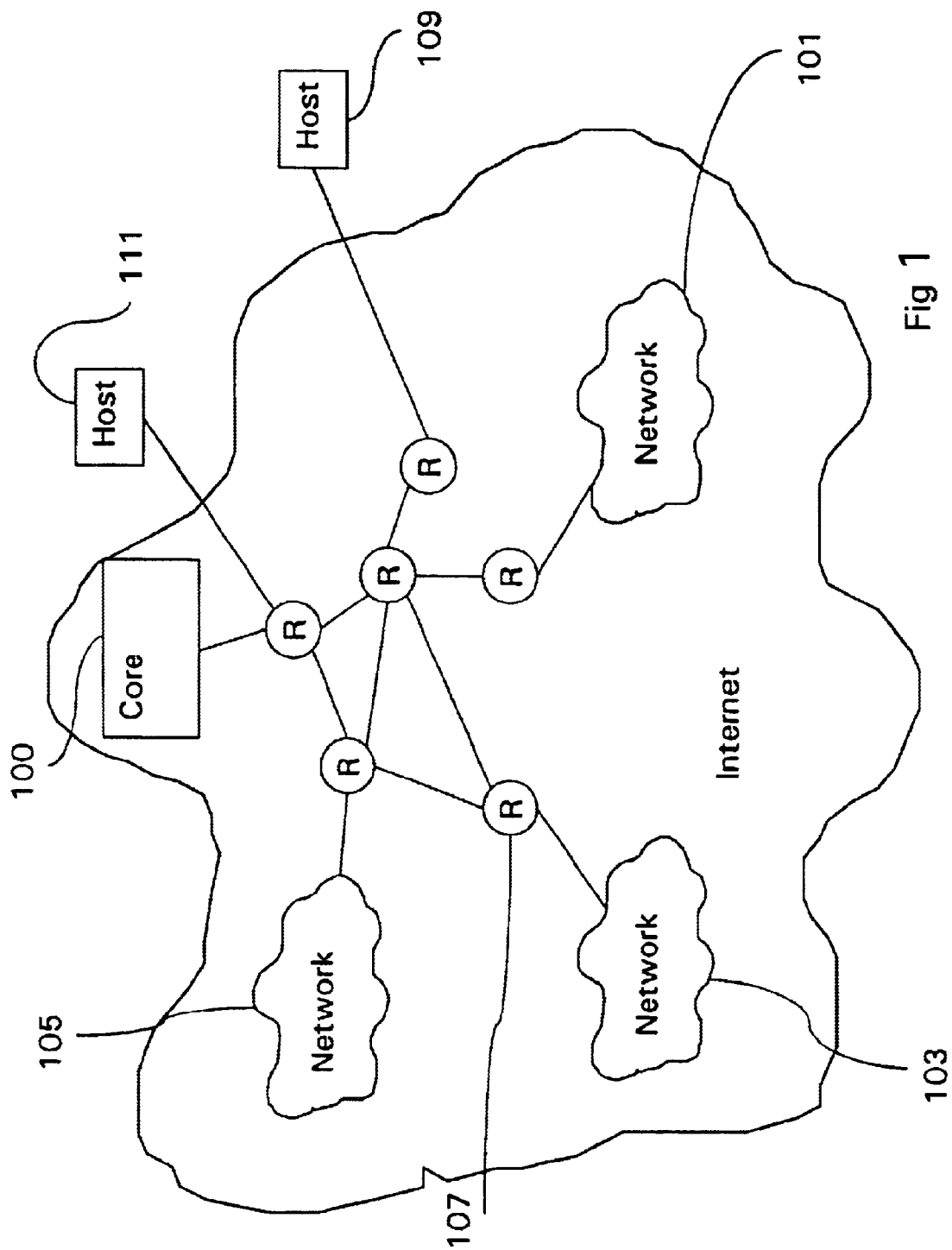
FIG. 1 is a schematic diagram of an IP network in operative association with the apparatus for assessing communication equipment.

With reference to FIG. 1 of the accompanying drawings, assessment apparatus 100 for assessing a network according to the present invention may be used to test and/or monitor operation of a network, and may generally be referred to as a 'core' 100. The testing and/or monitoring may be effected by analysing network traffic passing through a network arrangement, which traffic has either been injected into the network arrangement by the apparatus, or has been initiated by processes running on machines within the network arrangement. A network arrangement may include a plurality of networks 101, 103, 105 as shown in FIG. 1, or a single network. A single network may include an arrangement of two computers 201, 203 connected to one another, with or without a router (shown in FIG. 2 with a router), or an arrangement of many computers connected via a plurality of network routers 107, such as CISCO™ routers.

Client machines 109, 111 may connect to any one of the networks via routers 107.

Core

Figure 2:
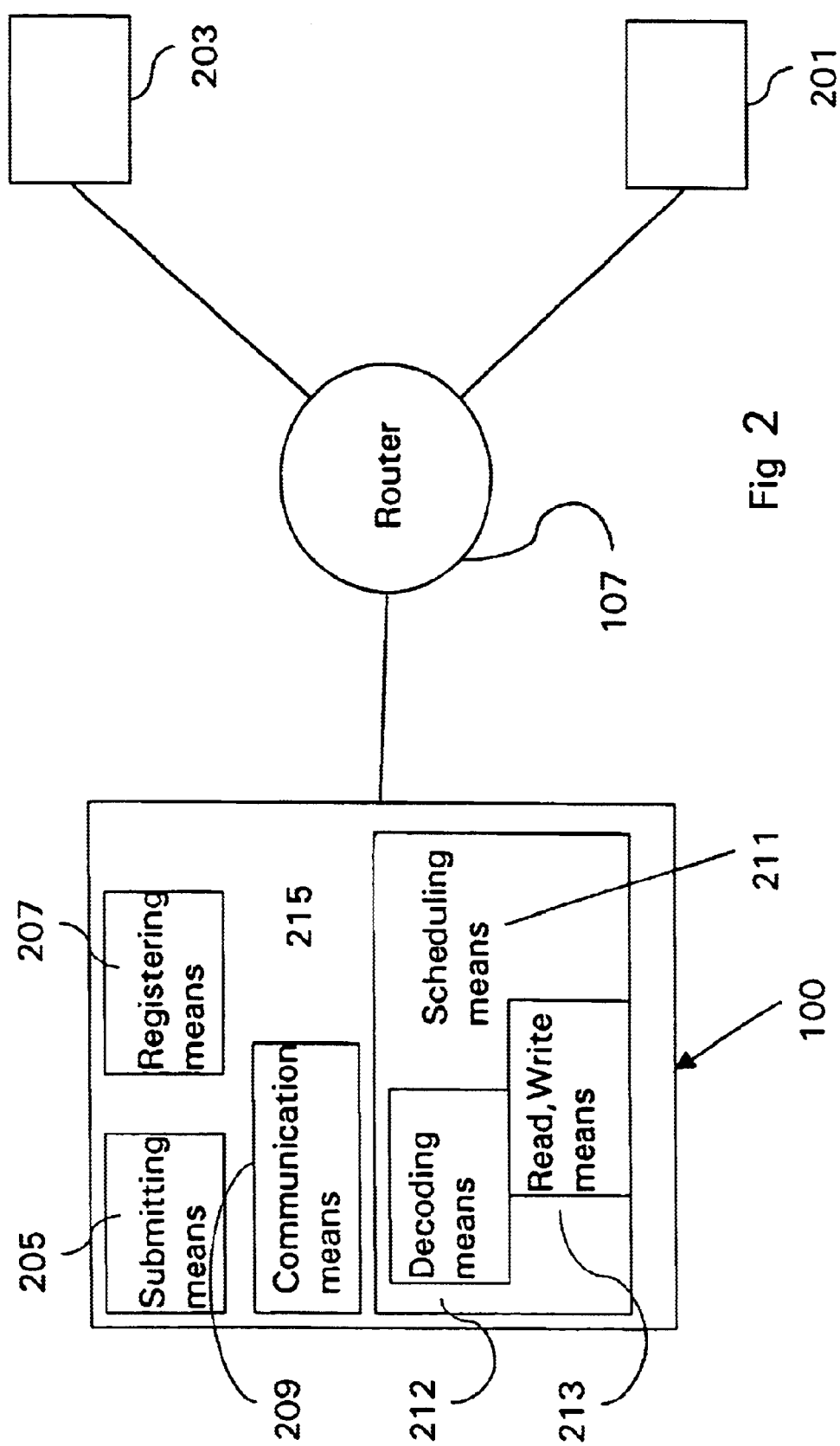
FIG. 2 is a schematic block diagram of the principal components comprising the apparatus for assessing communication equipment, when observing traffic being routed between two host machines.

In use, the core 100 is loaded on a computer 215, which computer 215 may either be dedicated to the core 100, and connected directly to a router as shown in FIG. 2, or may be a server computer supporting the core 100 and other processes and data connected remotely to the network (not shown). Referring to FIG. 2, an embodiment of the core 100 is shown divided into 4 functional parts:

SUBMITTING MEANS 205
REGISTERING MEANS 207
COMMUNICATIONS MEANS 209
SCHEDULING MEANS 211
   DECODING MEANS 212
   WRITE/READ MEANS 213

The SUBMITTING MEANS 205 submits a request defining a type of test or monitoring via a GUI (Graphical User Interface) or command line. When the core 100 is running on a dedicated computer, the GUI may be either loaded on to the computer, or may be downloadable onto a computer located remote from the dedicated computer, such that the GUI communicates with the core 100 from this remote computer. When the core 100 is running on a server computer connected remotely to the network, the GUI may be activated either local to, or remote from, the server computer. When the submitting means receives instructions from the command line, similar conditions apply, but there is no need to download a command line to accept and process the inputs. When a request is received by the submitting means 205, it is passed to the scheduling means 211 (described below) for processing.

The REGISTERING MEANS 207 registers transmission protocol processes that are required for transmitting packets of data. These processes include specifying parameters for building a packet, sending a packet and receiving a packet, and are protocol-specific. For example data transmitted over an IP network may involve the use of a transport layer protocol (e.g. TCP) and an internet layer protocol (IPv4), and there is therefore a corresponding build, send and receive function for each of them. The registering of protocols in this manner enables packets to be built and sent as scheduled by the scheduling means 211, which is effected in response to requests submitted by the submitting means 205.

The COMMUNICATIONS MEANS 209 provides a medium for communication between equipment on a network or other processes on the same computer. The communication means 209 acts as a port, or a channel, both for receiving requests that have been submitted by the submitting means 205 for processing by the core 100, and to send and receive packets of data.

The SCHEDULING MEANS 211 receives requests from the submitting means 205, schedules decoding of the request by the decoding means 212 into one or more processable events, and schedules capturing and sending of data packets by the read/write means 213. The scheduling means 211 continuously checks for incoming requests, so co-ordinates this activity with the processes performed by the decoding means 212 and the read/write means 213.

The DECODING MEANS 212 is used to decode incoming requests, to identify one or more processable events based on the requests, and to initialise these processable events. When requests are input via the command line, the request is formulated using command switches, e.g. -p -O 2048, and the event that is identified from the command switch (in this example -p) is decoded by the decoding means 212 into an event identifier. The event identifier is then used to identify corresponding processable events, which processable events are initialised for running by the read/write means 213.

The READ/WRITE MEANS 213 effects packet sending and packet capturing processes. These processes embed the processable events registered by the decoding means 212, such that data is sent and received as a function of the processable events.

These functional parts inter-operate in the following manner:

A user enters input at the command line in a predetermined format, which input both invokes the submitting means 205, and specifies a request for a network assessment process. The request is parsed through the communication means 209 to the scheduling means 211, which passes the request to the decoding means 212. The decoding means 212 decodes the incoming request into an event identifier, identifies one or more processable events based on the event identifier, and initialises these processable events via a start event. The decoding means 212 is also scheduled to execute a stop event to flush the system of any lingering events. Scheduling means 211 then schedules execution of the read/write means 213, which, because the processable events are embedded in the sending and capturing processes providing the read/write means 213, effects sending and capturing of data according to the processable events.

Embodiment of the Invention

An embodiment of the core 100 may be used in conjunction with customised tools that interface with the core 100 in a modular, or plug-and-play sense. In other words, the submitting means 205, registering means 207, the communication means 209 and the scheduling means 211 are independent of the request, which may be 'plugged' in via the processable events. The event identifier decoded by the decoding means 212 distinguishes one request from another, and thus the core 100 relies on the identified processable events to effect the specific features of the request. The following gives a non-exhaustive list of network features that may be examined by the core (when interfacing with an appropriate tool):

1. Quantifying how network equipment deal with packets of varying size;
2. Quantifying how network equipment deal with different packet generation frequencies;
3. Quantifying how an application responds to certain characteristics of a network (all configurable);
4. Quantifying the behaviour of new protocols;
5. Quantifying how the network equipment behave in response to new protocols;
6. Quantifying effectiveness of routing algorithms.

As the tools and the present invention inter-relate in a modular sense, the functionality of the core 100 is independent of the tool. However, the core 100 is described with reference to incoming testing requests, and the way in which the it 100 schedules reading and/or writing of data is described in relation to those requests.

The core 100 provides a service of communicating with network equipment according to requests received, and, as is well known in the art, all such network services are described by transmission protocols. Protocols provide rules for communication of data. They contain details of message formats, describe how a computer responds when a message arrives, and specify how a computer handles errors or other abnormal conditions. A suitable description of IP network protocols is provided in "Computer Networks", Andrew S. Tanenbaum, Pub. "Prentice Hall". There are application layer protocols, transport layer protocols and internet layer protocols, and these control how information is passed between the layers and ultimately over a network. Thus, in order for packets of data to be injected into a network, the data requires passing through each of these layers in accordance with the protocol definitions. The core treats protocol definitions as a centralised resource, which can be accessed by any process decoded from a request. Thus, functional definitions of all of the protocols are scheduled for registering before the scheduling means 211 looks for any incoming requests.

The registering process is performed by registering means 207. For the specific case of an IP network, such as an ethernet, typical protocols include:

Ethernet Protocol, Address Resolution Protocol (ARP) (network interface layer);
Internet Group Management Protocol (IGMP), Internet Protocol version 4 (Ipv4), Internet Protocol version 6 (Ipv6) (Internet layer);
Transmission Control Protocol (TCP), and User Datagram Protocol (UDP) (transport layer), (TCP/IP protocols can be used with ATM networks as well).
The processes for sending and receiving data are actually invoked when the read/write means 213 are run, so the function of the registering means 207 is to assign processable events for each of the protocols in preparation for actual building of packets, sending and receiving of data.

In an embodiment of the present invention the core 100 waits for a request to be passed on from the submitting means 205. In a preferred arrangement, the waiting for, and passage of, requests occurs via a socket that provides the communication means 209. As is well known in the art, a socket is a communications port. An application can use a socket to talk to other equipment on a network or other processes on the same computer. It does this by passing information containing identifying information to the operating system. For example, communication with another computer on a network requires identification of the network address of the computer, and communication with another process on the same computer requires identification of a specific file that the process monitors for receiving incoming 'calls'. The embodiment of the present invention utilises a socket in accordance with the latter scenario, and the scheduling means 211 is in effect listening for data from the submitting means 205.

The submitting means 205 may be a process running in operative association with input from either a GUI or the command prompt, such that as soon as a request is received from, for example, the command line, the submitting means 205 attempts to parse this request through the socket. When requests are received via the command line, the process invoking the submitting means 205, "nbexe", is typed in at the command line, together with one or more predetermined command switches. These command switches define a request, and parameters specifying features of the request, for a network assessment process.

The following example shows a request that may be input at the command line:

nbexe -c -f test.cap -P 2048

Thus nbexe calls the submitting means 205, and the command switch -c specifies a particular procedure to be processed. The remainder of the command switches, -f test.cap -P 2048, are parameters that need to be passed to a procedure corresponding to -c, and which further define the test and/or monitoring process requested.

As described above, the submitting means 205 parses this request to the scheduling means 211, which passes it to the decoding means 212. With reference to FIG. 3, the decoding means 212 first performs the following steps:

S3.1 Decodes the request into an event identifier (corresponding to -c) and event parameters (corresponding to -f test.cap -P 2048 ), in accordance with a set of predetermined conditions, in order to determine which test or monitoring process has been requested;
S3.2 Analyses the event identifier in order to identify a corresponding set of one or more corresponding processable events; and
S3.3 Assigns processes and a process identifier to these events.

Considering the example given above, for an input of nbexe -c -f test.cap -P 2048
-c is decoded into event identifier CAPTURE_FTN, which is used to identify a process for capturing data packets;
-P is decoded into a command that represents "capture data packets that are destined for port 2048 only"; and
-f test.cap is decoded into a command that represents putting captured data into file called test.cap.

The event identifier, CAPTURE_FTN, thus identifies one or more corresponding processable events, which include assigning initialisation processes. For example:

```
case CAPTURE_FTN: {
    ret=addTask(controller, p, initCapturePackets, output[i]);
        processId[i]=ret;/* Remember the process ID */ };
    break;
```

Where initCapturePackets is the initialisation function relating to capturing packets, and the function addTask registers a start status, finish status and an output status of requests that are received and are to be scheduled for processing by the scheduling means 211. Function addTask also returns a process identifier, ret, which is a numeric identifier that is unique to the request. The statuses are updated during the course of the processing of the request. The identifier is maintained internally by the core and provides a means of distinguishing between requests for protocol, interface assignment etc.

The decoding means 212 is then scheduled to process a start and a stop event (described below): the start event invokes whichever initialisation process was assigned at step S3.3 by the event identifier, which for the example above is initCapturePackets, and marks the task as initialised:

```
/* Call the initialisation function */
    ret=(*(n→init))(&n→t);
```

With reference to FIG. 4 of the accompanying drawings, a number of initialisation processes are effected at this stage:

S4.1 Populate operating parameters, which will be passed by the scheduling means 211 to the read/write means 213, with values and conditions specific to the event identifier. Most of these operating parameters embed the event parameters that were received at the command line (for the example above: -f test.cap -P 2048 and the relevant protocol and interface information that corresponds to a request for capturing data).

S4.2 Add Interfaces and Protocols, which are specific to the event identifier, to an interface and a protocol list maintained by the core 100 so that data can be read from and/or written to one or more interfaces (when scheduled to do so). There is one interface and one protocol list for each of the event identifiers. The following code fragments show three sets of function calls for protocols corresponding to three different event identifiers:

TABLE 1

| Switch | Event Identifier | Protocol function call |
|---|---|---|
| -c | CAPTURE_FTN | RegisterProtocol(O, ETHERNET, †->p.interface, cpp->buffer, &eh) |
| -p | PING_FTN | RegisterProtocol(O, ETHERNET, p.interface, pp->buffer, (void *)&eh) RegisterProtocol(O, IPv4, p.interface, pp->buffer, (void *)&ip) |
| -a | PROBE_FTN | RegisterProtocol(O, ETHERNET, pp->interface, buffer, (void*)&eh) RegisterProtocol(O, IPv6, pp-> interface, buffer, (void *)&ip) |

The function registerProtocol firstly adds an instance of the protocol to a list maintained by the core 100, and secondly calls a protocol function that builds a packet for sending (build packet function set up by the registering means 207 as described above). The specific build function that is called, and thus the form of the packet, is determined by the second argument passed via the registerProtocol function: IPv4, IPv6, ETHERNET etc. Building a packet, for the above example of IPv6, creates an IPv6 Header by storing elements selected from the structure ip at a location given by buffer:

```
char *iph=buffer;
struct ipv6_header *h=(struct ipv6_header *)ip;
IPH_SET_VERSION(iph, 6);
IP6H_SET_CLASS(iph, h→class);
IP6H_SET_FLOWLBL(iph, h→flowLabel);
IP6H_LENGTH(iph)=htons(h→payloadLength);
IP6H_NEXTH(iph)=h→nextHeader;
etc.
```

Note that this process merely creates the structure for sending a packet.

S4.3 Assign processes for sending and receiving packets of data, and also for ending the transfer of data; these are event identifier specific. For example:

TABLE 2

| Event identifier: PING_FTN | Event identifier: CAPTURE_FTN |
|---|---|
| †->end = endPing; | †->end = endCapturePackets; |
| †->receive = receivePing; e.g: endPing (struct task-_scheduler *†) | †->receive = receiveCapturePackets; |

This assignment of functions allows the functions to be called later, in processing an event to fulfill a request. For example, when t→end is called by the read/write means 213, in processing a PING_FTN request, this will cause endPing to run. The parameter passed to argument t in function endPing includes the operating parameters translated from the request.

The stop event (described below) is scheduled after the start event in order to terminate any residual events corresponding to previous requests (for example from previous instances of running the core 100).

Once the start and stop events have been processed by the decoding means 212, the scheduling means 211 schedules execution of the read/write means 213. For each request, the read/write means 213 effects either of, or a combination of, a read event and a write event.

Figure 5:
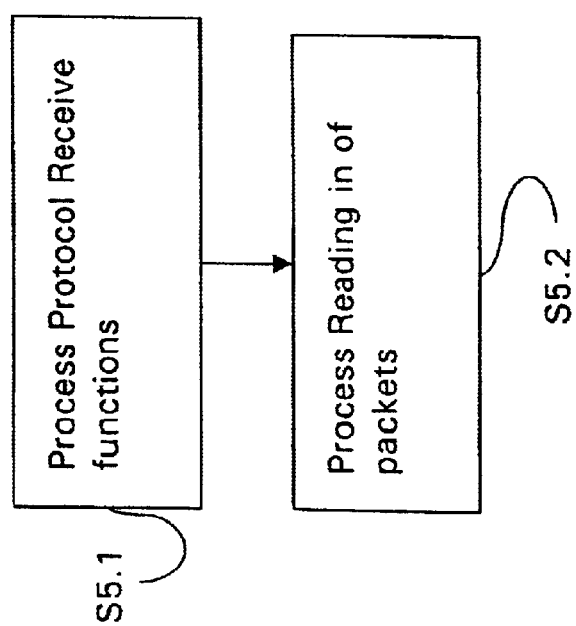
FIG. 5 is a block diagram showing the receiving processes performed by the read/write means of FIG. 2.

With reference to FIG. 5, executing a read event includes the following steps:

S5.1 Call a receive function that corresponds to each of the protocols added to the protocol list. All of the protocol receive functions on the list are processed because the read event does not know which packets a process wants:
for(k=0; k<n→protocolStack[i] [j].numberOfProtocols; k++){

/* If there is a receive function then call it */ if(schedNBC[n→protocolStack[i][j]. protocols[k]]. tsps.receivePacket!=NULL){/* The line below calls a receivePacket function, which was assigned to receiving functions corresponding to each of the protocols by the registering means 207. The actual receivePacket that is called is determined by protocols[k] */ ret=(*(schedNBC [n→protocolStack[i][j].protocols[k]]. tsps.receivePacket))(n→protocolStack[i] [j].protocolData [k], &rp);
/*This loop (loop on k) calls receive functions for all of the protocols that were registered on the list by registerProtocol for the current request*/

/*the i counter relates to the interface, j relates to the packet to be read and k relates to the protocols registered on the list for the current request*/ }

The function of receivePacket is to validate a packet when it is received. Thus if any of the protocols reject the packet then it is not passed for further processing; if all of the protocols on the list accept the packet then it is passed for an actual read. The order in which the protocols are activated for reading is determined by the protocol layer: thus network layer protocol reading is performed before internet layer reading, which is performed before transport layer reading.

S5.2 Process a read event that was pre-assigned by the relevant event identifier at step S4.3:
(*(n→t.receive))(&(n→t), &rp, j, rp.offset);

Re-calling the capture example above, where the event identifier was CAPTURE_FTN, t→receive was set equal to receiveCapturePackets. Thus calling t.receive invokes a process corresponding to the function receiveCapturePackets.

Figure 6:
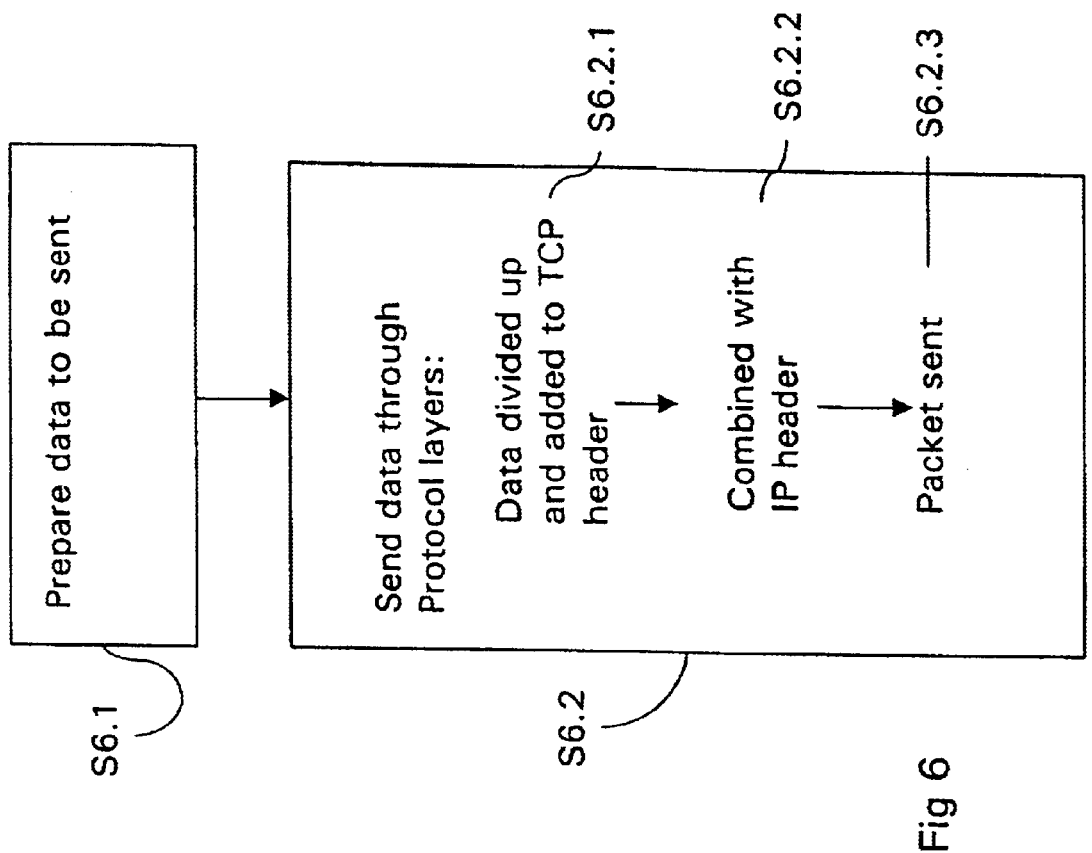
FIG. 6 is a block diagram showing the sending processes performed by the read/write means of FIG. 2.

With reference to FIG. 6, executing a write event includes the following steps:

S6.1 Check whether there are packets to be sent; if so, prepare data to be encapsulated within a packet for sending at a specific time, which in the following code fragment is controlled by variable microtime:
While (n!=NULL){
  If(n→t.nextSendMicrotime<=microtime) (*(n→t.send))
    (&n→t, microtime);
n=n→next; }
/* The condition of n!=NULL, where n identifies a request to be processed, forces the send routine to execute for all of the requests that have been registered at the time of calling the write process (processing of multiple requests is discussed below). */

Re-calling the capture example above, where the event identifier was CAPTURE_FTN, t→send was set equal to sendCapturePackets. Thus calling n→t.send invokes a process corresponding to the function sendCapturePackets for request n.

S6.2 Process the corresponding send functions for each of the protocols on the protocol list. This step is performed in accordance with the following time constraints:
if(schedInterfaceInfo[i].taskSI.nextSendTime<=microtime+ (i*2)), where nextSendTime is set up in the t.send call described above and microtime is an initialised time.

If the time constraint is satisfied, the following send routine is invoked:

for (k=n→protocolStack[i] [pq→stackId].numberOfProtocols; k>0; k--)
  ret=(*schedNBC[pps→protocols[k-1]].tsps.sendPacket)
    (pps→protocolData[k-1],pq→buffer, pps→offset[k-1]);
/*the i counter relates to the interface, pq→stackId identifies the packet to be sent out and k relates to the protocols that are registered on the list for the current request*/

This loop decrements through the protocols, to ensure that if more than one protocol is on the list for the current request, then the protocol sendPacket functions are activated in an order consistent with protocol requirements: for example, with reference to FIG. 6

S6.2.1 The data from step S6.1 is divided into packets and combined with any transport layer packet (application ID, checksum, application source ID) that was built at step S4.2;
S6.2.2 The packet that was created at S6.2.1 (transport layer packet) is combined with any internet layer packet that was built at step S4.2 (header information and routing addresses); and
S6.2.3 The packet is sent via the network interface layer.
As is to be expected, this process is performed in reverse order to the process of reading in packets (S5.2).
For passive protocols such as UDP, the function activated by a call to schedNBC[pps→protocols[k-1]] tsps.sendPacket at step S6.2.1 comprises binding the data from step S6.1 with the packet structure built at step S4.2, whereas for active protocols such as ARP, the corresponding send function invokes additional processes, such as broadcasting a request for a hardware address, when it is run. Further information can be found in "Internetworking with TCP/IP" Volume 1, Prentice Hall Ed., pp.73–81.

The above description relates to capturing and processing of a single request. However, the scheduling means 211 is operable to receive multiple requests, under the control of a timing loop:

if(microtime-schedLastRunTime>500000){/*every 0.5 seconds*/ schedLastRunTime=microtime; /*re-set time used for comparison*/
acceptCLICommands( );/*effects receipt of new requests and assigns new event identifiers according to steps S3.1–S3.3*/
if(schedNumberStart>0) schedStart( ); /*effects start process described in steps S4.1–4.3*/

/* If there are some tasks running then see if they need to be stopped */ if(schedNumberStop>0) schedStop( );/*effects stop process*/ }

The reading and writing of data, described above, is scheduled in response to any new requests received:

if(schedNumberOfWriteTasks>0)
schedWrite(microtime);/*effects writing of data: steps S6.1 and S6.2*/
if(schedNumberOfReadTasks>0){gettimeofday(&tv, NULL);
microtime=MICRO0TIME(tv);
schedRead(microtime);/*effects reading of data: steps S5.1 and S5.2*/ } where schedNumberOfWriteTasks and schedNumberOfReadTasks are set up in the initialisation process effected by start event. These processes run in parallel with the timing loop such that if a new request is received, then as soon as either of the variables schedNumberOfWriteTasks or schedNumberOfReadTasks are set, the corresponding read and/or write means will be effected. The embodiment of the core can also effect reading and writing of packets from multiple requests during one read and/or write event.

In addition to removing a request, the stop event also enables the core 100 to divert its resources to post-processing events, if required. The requirement for post-processing of data is dependent on the request that is received by the scheduling means 211, as this determines which function t.end is assigned to (S4.3). As can be seen from the code fragment above, the stop event is scheduled to run every 0.5 seconds, after checking for new requests and effecting the initialisation events via the start process. The stop event allows the core 100 to co-operatively multi-task between (a) post-processing of data and (b) receiving, reading and writing of data described above; thus the scheduling means 211 time-slices between the events to ensure that both (a) and (b) processes have a chance to run. If post-processing of the data is required, this is effected after the type (b) events have finished running; the stop event will firstly remove the relevant process from the scheduling means 211, and then divert the resources for the relevant post-processing actions:

if(n→remove && ((! schedYieldInUse || n→t.reentrant) && ! n→inStop) ){
/* schedYieldInUse: This is to prevent multiple processes from yielding at the same time. A stop event will not occur if the yield function has been called, unless the process has indicated that it does not use it (t→reentrant is set). */
/* Remove the task from the schedule */
ret=(*(n→t.end))(&n→t);
/*this points to the t.end that was assigned in the initialisation routines—S4.3 and as shown above in Table 2 */

Thus the function that has been assigned to n→t.end will determine whether there is any post-processing to be performed. If there is post-processing to be carried out, the scheduling means 211 splits the post-processing into a number of sub-processes, and schedules execution of type (b) events (receive and decode requests, execute start events, read events, write events) in between the sub-processes (co-operative multi-tasking).

When a request has been processed, the stop event frees up the interfaces, protocols and memory that were added to the list during the initialisation (S4.1, S4.2) for that request.

Implementation

The submitting means 205, registering means 207, communications means 209, scheduling means 211, decoding means 212 and read/write means 213 are written in the 'C' programming language. The embodiment of the present invention could be located on:

a server that receives input from other computers;
a computer (client) that is connected to a router;
a computer (client) that is connected to a server;

and could be run on any operating system. For illustrative purposes, the following assumes that it is running on the LINUX™ operating system: To start the system at boot-up, the following script needs to be placed into directories /etc/rc.d/rc3.d and /etc/rc.d/rc5.d:

./etc/rc.d/init.d/functions
ifconfig eth0 up
bring any other interfaces up here as well
daemon/home/napoleon/nbd The submitting means 205 discussed earlier in the description may be run from either a command shell located on the same computer as the scheduling means 211, or a GUI loaded on an SNMP (Simple Network Management Protocol) host or an HTTP (Hypertext Transfer Protocol) host. The GUI may be stored in a data store remote from the host machines or on the host machine itself. In these latter two cases, the requests may be communicated to the scheduling means 211 either by email or via the internet.

The following is a non-exhaustive list of protocols that may be registered by the registering means 207 for an internet protocol network:

Ethernet;
IPv4;
IPv6;
ARP;
IGMP;
UDP;
TCP;
RIP (Routing Information Protocol);
OSPF (Open Shortest Path First).

where the latter two protocols are routing protocols, and the others have been defined earlier in the description. In addition, if the scheduling means 211 is receiving requests and outputting data via SNMP, the protocol is registered by registering means 207.

In the description relating to the core, the term request, data, and input are used interchangeably to describe requests that are input to the apparatus for assessing a network.

Emulator

Figure 7A:
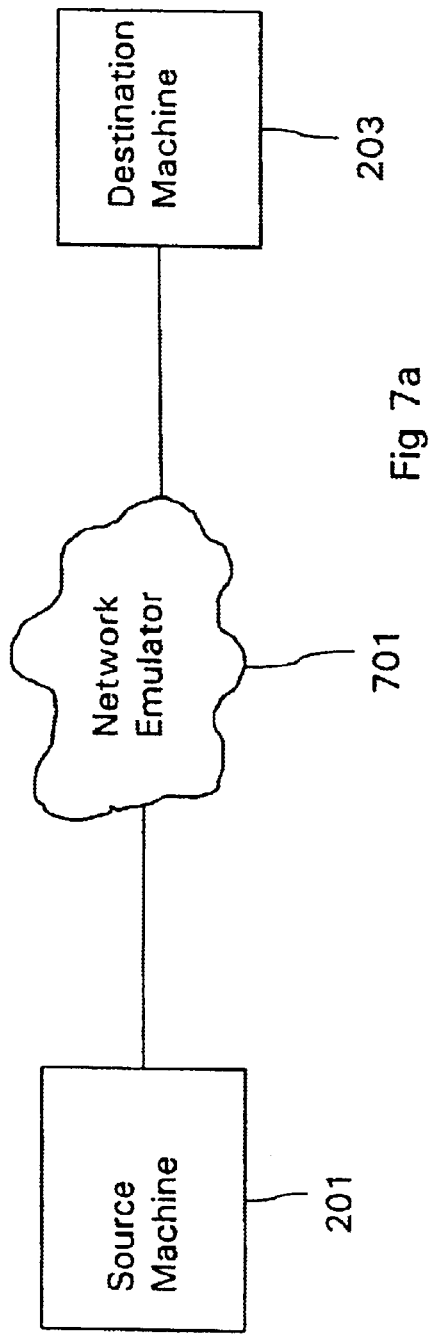
FIG. 7a is a schematic diagram of apparatus for emulating network characteristics.

Apparatus for emulating network characteristics may generally be referred to as an emulator 701. As shown in FIG. 7a, the emulator 701 intercepts packets of data that are passed between a source machine 201 and a destination machine 203, and applies a plurality of predetermined rules to the packet, which effectively changes the transmission characteristics of the network.

The aim of the emulator 701 is to simulate a variety of network conditions, for a variety of packets that embed a range of protocols, and over a range of types of networks. Thus the variation in packet type is partially a function of the application, for example ftp, telnet, and email, that sends the data across the network. Using means 703 to effect a change to the transmission characteristics of the network shown in FIG. 7b, the emulator 701 subjects these packets to drop, delay, jitter, etc., which allows the associated applications to review their methods for handling such network interruptions. This is extremely valuable, as network software is often tested using highly reliable, low-delay local area networks (LANs), which may not expose potential failures. Furthermore, with applications that use the UDP transport protocol, where the application takes full responsibility for handling problems of reliability, such as message loss, duplication, delay etc, it is often the case that the application does not include adequate mechanisms for dealing with all possible modes of packet-interference.

Figure 7B:
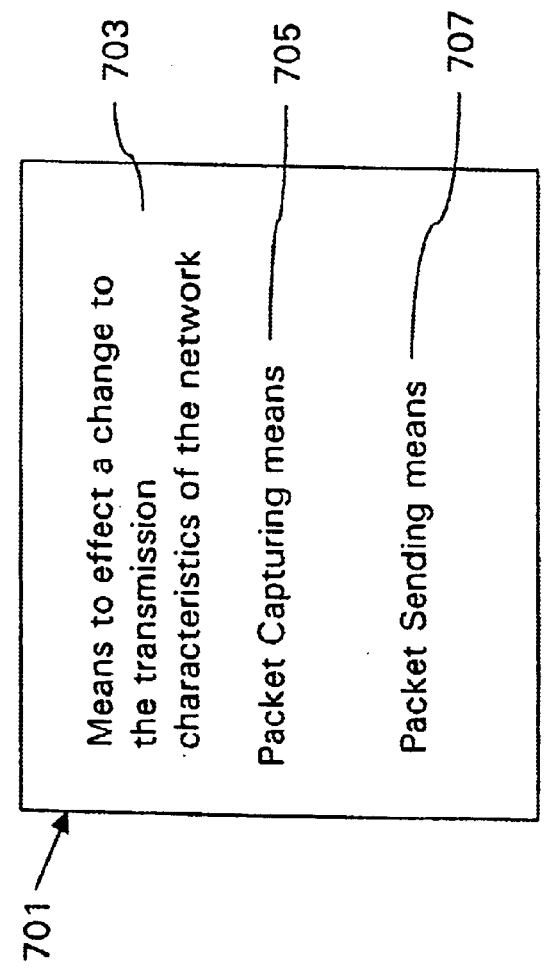
FIG. 7b is a schematic block diagram of the components comprising the apparatus for emulating network characteristics.

As the emulator 701 works on packets of data travelling across a network, it includes capturing means 705, shown in FIG. 7b, for capturing packets, and sending means 707 for injecting packets into the network. The capturing means and sending means 705, 707 may be provided by the read/write means 213 of the core 100, or any equivalent means.

Thus the means 703 to effect a change to the transmission characteristics of the network operates on the packets once they have been captured by the capturing means 705. The modified packet is then passed to the sending means 707 for injection back into the network (or not, depending upon predetermined rules). When the emulator 701 works in operative association with the core 100, following steps are effected:

S8.1 submitting means 205 sends a request to the scheduling means 211—e.g nbexe -n -b 90 -x 10, where -n signifies a request for an emulating event.

S8.2 scheduling means 211 passes the request to decoding means 212, which decodes the request into an event identifier EMULATOR_FTN and event parameters corresponding to -b 90 -x 10;

S8.3 decoding means 212 calls the relevant function to register a process identifier for this request, and assigns the emulator initialisation function via function call addTask(controller, p, initNetworkEmulator, output[i]);
processId[i]=ret;

S8.4 decoding means 212 initiates a start event, which calls the function initNetworkEmulator. This function registers the protocols and interfaces needed for the emulating event, and these are added to the list for this request (identified as specific to the emulator by the process identifier):

registerProtocol(0, ETHERNET, i, buffer, &eh)

registerInterface(0, 1, 1);

registerInterface(1, 1, 1);

The start event also assigns processes for receiving and sending of data and stopping processing the request:

t→send=sendNetworkEmulator;
t→receive=receiveNetworkEmulator;
t→end=endNetworkEmulator;

S8.5 scheduling means 211 executes a read and write event. If the network emulating request is the sole request that the core has received at this point, there will not be any data for sending out, and the read/write means 213 will only effect a read event. As described in S5.1, the read event firstly processes a receivePacket function, which, as the protocol that was registered on the list for this request was ethernet only, will call function receiveENETPacket only. The read event then processes a t→receive function, which calls function receiveNetworkEmulator (described below, with reference to FIG. 9). As the scheduling means 211 operates in a continuous loop (see above), the read/write means 213 is scheduled to execute another send event. If the read event has finished processing data according to the processes in function receiveNetworkEmulator, any data that has been prepared for sending into the network will be sent out by the send event, which is controlled by function sendNetworkEmulator.

S8.6 Once all of the read and write events have been processed, scheduling means 211 executes a stop event via the decoding means 212, and, for a network emulating request, this calls function endNetworkEmulator.

The changes that may be effected to the packets at S8.5 include:

dropping packets;
delaying packets;
misordering packets;
applying jitter to packets;
limiting the bandwidth of the network;
queuing the packets; and
duplicating packets.

The processes that affect network traffic are largely random in nature; thus, in order to realistically simulate network conditions, the packets that are interfered with by the above means are selected randomly by the emulator 701. This can be effected using a fixed pseudo-random number generator, which uses deterministic sources of "pseudo-random" numbers. These typically start with a "seed" quantity and use numeric or logical operations to produce a sequence of values. A typical pseudo-random number generation technique, known as a linear congruence pseudo-random number generator, is described in "The Art of Computer Programming", Volume 2: Semi-Numerical Algorithms, Chapter 3: Random Numbers; Addison Wesley Publishing Company, Second Edition 1982, Donald E. Knuth. Other means of selecting packets at random include associating each packet with a number that has been randomly selected from a database populated with numbers, or retrieving numbers that have been generated by a random process, such as a Markov process.

In all of these cases, the numbers that are generated at random are compared against one or more predetermined thresholds according to predetermined rules, and the treatment of the packet is dependent on the outcome of this comparison. The predetermined thresholds are user-configurable, and may be defined using the submitting means 205 of the core 100, or any suitable alternative.

Drop, Delay, Jitter and Queuing of Packets

When the thresholds are entered via submitting means 205, as described above with reference to FIG. 8, typical thresholds may be: nbexe -n -b 90 -x 10 -w 5 -e 10 -o 1 -k 4 which specifies "allow 10% of packets through without interference; drop 10% of all packets; delay the remainder by between 5 and 10 ms; drop/delay between 1 and 4 packets at one time"

Processing of this request by the emulator 701 is illustrated with reference to FIG. 9:

S9.1 Capture one or more packets (via receiveNetworkEmulator (S8.5) when the emulator 701 is in operative association with the core 100);

S9.2 Generate a first random number and compare it with interference threshold (b). If the first random number is outside of the threshold, let it go without interference, else pass onto S9.3

S9.3 Generate a second random number and compare it with the drop threshold (x); if second random number is outside of the threshold it must be for delaying—pass to S9.4, else is for dropping—just drop S9.4 Generate a third random number, which is used in conjunction with a predetermined delay profile to determine the delay to be applied. The delay profile can either be read from a file, if the file name is specified at the command line. Alternatively, if a delay profile is not specified (i.e. no file name is given), then it is assumed that each millisecond in the delay range has equal weighting. If a profile is specified, then the third random number is used to extrapolate a delay time within the delay period:

/* Generate a delay value based on where the delay occurs within the minimum and maximum delays that were specified. If we have a profile then use it; otherwise just calculate where the point is as a fractional quantity */
if(DELAYPROF_SET(t→p))}

/* where np→r is the third random number; this line identifies the nearest point to the delay required*/
num=np→delayTime[(int)(np→r*100.0)];

/*this identifies the exact delay time*/
while(np→r>np→delayProfile[num]) num++;

/*add the fraction to the minimum*/
np→delay=num+t→p.min_delay; } else {
np→delay=(int)((((double)(t→p.max_delay-t→p.min_delay)/(double)100)* np→r)+(double)
t→p.min_delay); }

S9.5 Assign a queuing location for the packet(s) in a running cycle, according to the delay time calculated at S9.4.

The queuing location is calculated from the current time in the cycle ($t_{posincycle}$): if a delay time of 14 milliseconds is generated at S9.4, then this means a delay of 14 ms from now, wherever now may be in the current position of the running cycle. If, for example, the running cycle is currently in 5 ms, and the maximum delay for the present cycle is 12 ms ($t_{cycle,max}$), the delay of 14 ms ($t_{delay}$)from 5 ms is assigned a queuing position by calculating:

$$\frac{t_{delay}}{t_{cycle,max}} : \text{number of revolutions of cycle} +$$

$$t_{delay} - (t_{cycle,max} - t_{posincycle}) \text{ for position in cycle.}$$

Thus for the example given:
14/13=one revolution of the cycle+14−(13−5) such that the packet would be queued to be sent at 6 ms in the following revolution of the cycle.

S9.6 Send the packet when the queued time is the current time (controlled via sendNetworkEmulator when the emulator 701 is in operative association with the core 100).

Jitter, defined as a variation in delay between delayed packets, is introduced by applying different delays to packets. As the assignment of a delay is a function of a random number for each packet, one packet is likely to have a different delay compared to others that are being delayed. Therefore jitter is introduced implicitly to the system by the method described above.

Duplicating Packets

A packet can be duplicated by:

capturing a packet;
analysing its content; and
generating an identical packet to the captured packet.

A request for duplicating a packet can be made via the submitting means 205, by specifying alternative event parameters to those included in the request described above.
e.g. nbexe -n -f test.cap -t 60 -Z,
which specifies "capture packets for 1 minute, write the characteristics to a file, and reproduce the characteristics by generating packets identical to those captured". Generating a second (identical) packet involves writing a packet, which may be performed using the read/write means 213 of the core 100 described above (or other suitable means). The second packet may additionally be delayed relative to the first, by specifying a delay profile that controls the timing of writing of packets.

Limiting the Bandwidth

Bandwidth may be defined as the network's volume capacity:
Number of packets×size of packets×8.

Thus changing either the number of packets or the size of packets will change the bandwidth. The number of packets can be controlled by generating additional packets, or by permanently capturing packets, and the size of packets can be controlled by specifying the packet size when generating a packet. These parameters could either be entered at the command line for receipt by the submitting means 205, when the emulator 701 operates in conjunction with the core 100, or could be read in from a file.

The bandwidth could also be controlled between certain source and destination addresses, by specifying desired MAC (physical address) and IP source and destination addresses at the command line, or in a file. Thus as an extension to FIG. 7a, the emulator 701 could be positioned between two or more machines, and control the flow of traffic therebetween.

Once the emulator 701 has finished processing packets, it outputs statistics summarising how many packets were delayed, and the delay times, the number of packets received on each interface, and the number of packets that were dropped on each interface.

What is claimed is:

1. Apparatus for testing and/or monitoring the transmission of data packets by communications equipment, the apparatus comprising:

(i) registering means for registering one or more transmission protocols to enable the apparatus to communicate according to any registered protocol;

(ii) submitting means for submitting a request, the request specifying at least one testing and/or monitoring operation;

(iii) decoding means for decoding a received request into one or more processable events in accordance with one or more predetermined rules;

(iv) read/write means for controlling the writing of data packets to, and the reading of data packets from, the communications equipment; and (v) scheduling means for scheduling decoding of received requests and execution of the one or more processable events in accordance with the read/write means, such that, when a request is received from the submitting means, the scheduling means schedules:

a) decoding of the request into one or more processable events by the decoding means;

b) initialisation of the processable events by the decoding means; and c) reading and writing of data packets from and to the communications equipment by the read/write means in accordance with the processable events.

2. Apparatus according to claim 1, wherein the processable events include post-processing of data that has been read from the communications equipment.

3. Apparatus according to claim 2, further including means to allow multiple tasks to run concurrently, such that when there is post-processing to be carried out, the post-processing of data and real-time testing and/or monitoring each take turns to use the resources of the processing means.

4. Apparatus according to claim 1, wherein the apparatus is configurable to process any one of the following requests:

a) Capture packets;
b) Replay packets;
c) View packets;
d) Generate packets;
e) Generate multiple streams;
f) Emulate a communications equipment;
g) Generate a packet probe;
h) Change header fields;
i) Bridge;
j) Join multicast groups; and
k) Leave multicast groups.

5. Apparatus according to claim 1, wherein the communications equipment is either one of an internet protocol network or an asynchronous transfer mode network.

* * * * *